H. W. FARLEY.
Pressure Gage:
No. 26,900. Patented Jan'y 24, 1860.
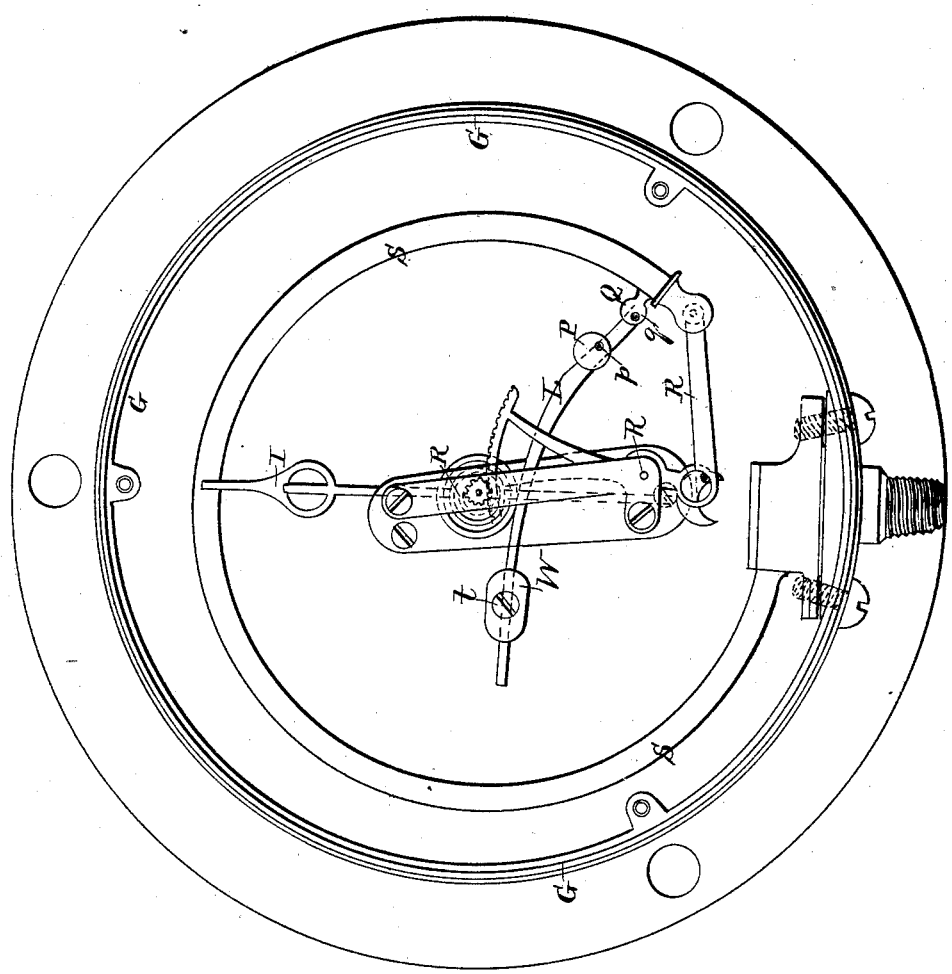
Witnesses.
W. H. Ide
H. P. Jaques
Inventor.
Henry W. Farley

UNITED STATES PATENT OFFICE.

HENRY W. FARLEY, OF HANNIBAL, MISSOURI.

PRESSURE-GAGE.

Specification of Letters Patent No. 26,900, dated January 24, 1860.

*To all whom it may concern:*

Be it known that I, HENRY W. FARLEY, of Hannibal, in the county of Marion and State of Missouri, have invented an Improvement upon the Pressure-Gages Known as the "Bourdon Gages," patented in France by one Eugene Bourdon, June 18, 1849, and in the United States by the same Eugene Bourdon, No. 9,163, August 3, 1852, and used for measuring, indicating, and regulating the pressure and temperature of fluids, and, among other things, for indicating the pressure of steam in locomotive and other engines; and I do hereby declare that the following is a full and exact description.

In the accompanying drawing, G, G, G, represents one form of the Bourdon gage, with the dial removed so as to present to view the active parts of the gage together with my improvement attached.

S, S, represents the curved tube or spring of the gage; R, R, R, the apparatus for communicating the motion of the tube or spring to the indicator I.

There is an imperfection in the action of the Bourdon gage caused by the vibration of the tube or spring S, when the gage is in motion by being carried upon a locomotive or otherwise, thereby producing a like vibration or unsteadiness in the indicator of the gage.

The purpose of my invention is to remedy this imperfection.

My contrivance and method of combination with the gage are as follows, and I claim the same and all contrivances and combinations substantially the same or equivalent thereto.

The lever L, is made crooked as represented in the drawing. Near the unconfined end of the tube or spring S, and within said tube or spring, is a short post P, firmly set in the posterior wall of the gage and at a right angle thereto, in the upper side of which post a small slit is cut sufficiently large to receive the lever L, which is so made as to adapt itself to the slit. Upon and near the free end of the tube or spring S, and on the inside thereof, a second post Q, is firmly attached, in the top of which a similar slit is cut, sufficiently large to receive the end of the lever L. The lever L, is held in the slit of the post P, by a pin $p$, passing through the post and the lever near the end, upon which pin $p$, as a fulcrum, the lever L, freely moves. One end of the lever L, is attached to the free end of the tube or spring S, by being held in the slit of the post Q, by a pin $q$, passing through said post and the end of the lever L, the slit in the post and the hole in the lever through which the pin passes being large enough to admit of the free movement of the lever upon the pin. Upon the free end of the lever L, the sliding weight W, is placed, to be held firmly at the desired point upon the lever by means of the screw $t$.

Thus constructed, or substantially thus, the depression or elevation of the free end of the tube or spring S, raises or lowers the weight W, and the holes in the lever L, for the pins $p$, and $q$, must be of such size as to permit the lever to play freely upon the pins and accommodate itself to the motion of the free end of the tube or spring S, when said lever is operated upon by the action of said tube or spring in the gage.

The construction and combination of my contrivance are such that the weight W, attached upon one portion of the lever L, on one side of the fulcrum $p$, shall counterbalance the spring attached to the other portion of the lever on the other side of the fulcrum $p$, so that the effect of any jar or other external force which would tend to bring the spring down and out of its proper place for indicating correctly the pressure upon it, will be neutralized by the same jar or other external force acting upon the weight W, with a contrary resultant effect upon the tube or spring S, and this in every position the tube or spring may assume under the pressure it is to indicate; for the leverage of the tube or spring S, and the leverage of the weight W, upon the fulcrum $p$, increase and decrease proportionally and pass and return to their limits at the same time, so as to keep constant the equipoise of the weight W, and the tube or spring S, when that equipoise has been once obtained by securing the weight W, upon the proper point of the lever L.

The form and position of the lever L, the size and position on the lever of the weight W, and the point at which the lever is connected with the spring S, as well as the mode of connection, may each and all be varied without substantially altering the principle or effect of my contrivance. It may be desirable in some forms of the Bourdon pressure gages to place the post P, outside of the spring S.

What I claim as my improvement and invention consists in the lever L, and weight W, or their equivalents, in combination with Bourdon's pressure gage spring S, in such a manner that the effect of any jar or external force upon the tube or spring S, when in action, shall in all positions of the spring be counterbalanced or neutralized by the effect of the same jar or external force upon the weight W, and the tube or spring be thus left to act undisturbed save by the pressure which is to be indicated, measured, or regulated, by the gage, thereby securing a more perfect operation of the gage, and constant correctness of the indicator.

I totally disclaim all and every portion of the Bourdon gage as being any part of my invention.

HENRY W. FARLEY. [L. s.]

Witnesses:
ASA ROBBINS,
LYMAN PACKARD.